United States Patent
Chen et al.

(10) Patent No.: US 11,174,425 B2
(45) Date of Patent: Nov. 16, 2021

(54) CARBONATE RESERVOIR FILTRATION-LOSS SELF-REDUCING ACID

(71) Applicant: SOUTHWEST PETROLEUM UNIVERSITY, Chengdu (CN)

(72) Inventors: Weiyu Chen, Chengdu (CN); Liqiang Zhao, Chengdu (CN); Zhifeng Luo, Chengdu (CN); Juan Du, Chengdu (CN); Pingli Liu, Chengdu (CN); Nianyin Li, Chengdu (CN); Kun Xu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/910,807

(22) Filed: Jun. 24, 2020

(65) Prior Publication Data

US 2021/0017445 A1   Jan. 21, 2021

(30) Foreign Application Priority Data

Jul. 18, 2019  (CN) .......................... 2019106506772

(51) Int. Cl.
| | | |
|---|---|---|
| *E21B 21/08* | (2006.01) | |
| *C09K 8/76* | (2006.01) | |
| *C09K 8/68* | (2006.01) | |
| *C09K 8/72* | (2006.01) | |
| *C09K 8/92* | (2006.01) | |

(52) U.S. Cl.
CPC .................. *C09K 8/76* (2013.01); *C09K 8/68* (2013.01); *C09K 8/725* (2013.01); *C09K 8/92* (2013.01); *E21B 21/08* (2013.01); C09K 2208/30 (2013.01); C09K 2208/32 (2013.01)

(58) Field of Classification Search
CPC ... C09K 8/76; C09K 8/68; C09K 8/92; C09K 2208/32; E21B 2208/30
See application file for complete search history.

(56) References Cited

U.S. PATENT DOCUMENTS

| 3,948,324 A * | 4/1976 | Lybarger ................. E21B 43/25 166/307 |
| 2009/0221455 A1* | 9/2009 | Ke .......................... C23F 11/04 507/261 |
| 2014/0076572 A1* | 3/2014 | Gadberry ................. C09K 8/74 166/308.4 |
| 2016/0009986 A1* | 1/2016 | Crews ..................... E21B 29/00 166/376 |
| 2017/0335654 A1* | 11/2017 | Olsen .................. E21B 41/0092 |
| 2018/0127640 A1* | 5/2018 | Nguyen .................... C09K 8/86 |
| 2018/0334612 A1* | 11/2018 | Bulekbay ................ E21B 43/26 |

* cited by examiner

*Primary Examiner* — Silvana C Runyan
(74) *Attorney, Agent, or Firm* — Muncy, Geissler, Olds & Lowe, P.C.

(57) ABSTRACT

The present invention relates to a carbonate reservoir filtration-loss self-reducing acid fracturing method. The carbonate reservoir filtration-loss self-reducing acid fracturing method comprises the steps: (1) calculating a fracture pressure and a fracture extension pressure of a reconstructed reservoir; (2) injecting an agent A into a stratum under a pressure higher than the stratum fracture pressure, so that fractures are generated on the stratum; (3) injecting an agent B into the stratum under a pressure higher than the stratum fracture pressure, such that the agent B extends the fractures and communicates with a natural fracture net; (4) pumping an acid liquor system agent C with a high etching power into the stratum under a pressure higher than the extension pressure but lower than the fracture pressure to improve the conductivity of the fractures; (5) injecting a displacing liquid agent D under a pressure lower than the stratum fracture pressure to jack acid liquor in a well casing into the stratum; and (6) shutting down a well and performing flow-back. The agent A is a gel acid or VES acid, the agent B is a filtration-loss self-reducing gel acid or filtration-loss self-reducing VES acid, the agent C is closed acid, and the agent D is a displacing liquid. According to the method of the present invention, precipitation type solid filter cakes are formed on wall surfaces of the fractures by utilizing a filtration-loss self-reducing system, so as to perform temporary blocking to reduce the filtration loss. The technology is simple with easy injection, and the filtration-reducing agent is easy to disperse and flow back, and the method is safe and environment-friendly.

12 Claims, No Drawings

CARBONATE RESERVOIR FILTRATION-LOSS SELF-REDUCING ACID

TECHNICAL FIELD

The present invention relates to a temporary blocking and filtration-loss reducing acid fracturing process used in the oil-gas field development, and more particularly relates to a carbonate reservoir filtration-loss self-reducing acid fracturing method.

BACKGROUND

Acid fracturing is one of the main measures to increase production of carbonate reservoirs. However, during the process of acid fracturing, a phenomenon of loss of acid liquor along acid-etched fractures, which affects the extension along main fractures. The scope of acid fracturing reconstruction is limited, resulting in poor effect or even failure of acid fracturing construction. Therefore, in order to improve the efficiency of acid fracturing construction and increase extension lengths of the main fractures, it is necessary to control the acid liquor loss and realize deep etching of the fractures. In order to solve such problem, the most common measure applied is to introduce a filtration-loss reducing agent or increase the viscosity of the acid liquor during the construction process to achieve the effect of reducing the filtration loss of the acid liquor.

In recent years, the output of many oil fields in China has declined. After the conventional primary and secondary oil exploitation, there is still a large amount of remaining oil that has not been exploited yet. Therefore, there is still a lot of work to be done to tap the potential of old oil fields. Under the circumstance of increasing energy shortage, the operation of increasing production has become a major issue in petroleum exploitation researches. For carbonate reservoirs, the targets for production increasing measures are becoming more and more complex. Affected by high-temperature environments of deep stratums in some deep wells and ultra-deep wells, the reconstruction targets have developed from low permeability and single well to medium and high permeability and overall oil fields. In view of this problem, in order to prevent the acid liquor loss and improve the efficiency of increasing production, the requirements on filtration loss reduction in acid fracturing in production increase measures are becoming higher and higher.

A large number of researches have been carried out on filtration loss reducing methods at home and abroad. Liquid thickening for filtration loss (cellulose and derivatives thereof, humic acid and derivatives thereof, modified starch, polyacrylamide) and solid phase materials (resin, cellosilk, silicon powder) for filtration loss are commonly used. In "An Organic Cross-Linked Acid System and Preparation Method and Application Thereof (CN109575905A)" and "A Cationic Gel Acid Thickener and Preparation Method Thereof" (CN106318369A), the purpose of reducing the filtration loss is achieved by increasing the viscosity of acid liquor. In "An Embedded High-Pressure-Resistance Plugging Agent (CN108300435A)" and "A Method for Preparing Cellulose Ether and Cellulose Ether Obtained by This Method" (CN105111317A), the purpose of temporary blocking for reducing the filtration loss is achieved by using fibers. In "A Filtration Loss Reducing Agent for Full Oil-Based Drilling Fluid and Preparation Method Thereof" (CN104610936A) and "A Filtration Loss Reducing Agent for Drilling Fluid and Preparation Method Thereof" (CN102766240A), the purpose of temporary blocking for reducing the filtration loss is achieved by using humic acid and derivatives thereof. In "Filtration Loss Reducing Agent for Amphoteric Phenolic Resin High-Temperature Drilling Fluid and Preparation Method Thereof" (CN105154035A) and "A Nano Filtration Loss Reducing Agent for Fracturing Fluid and Synthesis Method Thereof" (CN103642482A), the purpose of temporary blocking for reducing the filtration loss is achieved by using resin particles.

The above filtration loss reducing methods have been developed and widely used, but all have certain limitations. Cross-linked polymers are mainly used in liquid thickening for reducing the filtration loss. The thickened acid liquor has the problems of difficult injection and much residues after gel breaking. The reduction in filtration loss by solid phases has the biggest problem of poor injection performance and serious wear to injection equipment, which is difficult to achieve effective reduction in filtration loss. The above filtration loss reducing methods have certain restrictions on the reservoir and wellbore conditions.

SUMMARY

An object of the present invention is to provide a carbonate reservoir filtration-loss self-reducing acid fracturing method. The method is reliable in principle and simple and convenient to operate, and is an acid fracturing process for temporary blocking to reduce the filtration loss by forming precipitation type solid filter cakes on wall surfaces of the fractures by using a filtration-loss self-reducing system under the conditions of carbonate reservoirs. This method is simple in process, low in cost, resistant to temperature and salt and easy to inject. The temporary blocking type filtration loss reducing agents are easy to disperse and flow back after construction, and achieve favorable filtration loss reducing performances, without causing any serious pollutions to a stratum. Therefore, the method is a safe, environment-friendly and simple filtration loss self-reducing process.

To fulfill the above technical object, the present invention adopts the following technical solutions.

According to the present invention, the liquid-phase filtration loss self-reducing acid liquor system undergoes chemical and physical actions under reservoir conditions to form solid-phase dispersed particles, and a large number of dispersed particles are aggregated, thereby achieving the functions of temporary plugging for filtration loss reduction and turning to acidification in the process of acid fracturing, and finally communicating with the stratum in multiple angles to achieve effective acidification. Liquid injected into the stratum has better temperature and salt resistance performances and injection performances compared with polymers, and has the effects of easy injection, effective reduction in filtration loss and reduction in wear of equipment pipelines compared with a solid-phase temperature blocking agent. Meanwhile, the method has the beneficial effects that the dispersed particles are easy to flow back with less damages to the stratum after construction.

A carbonate reservoir filtration-loss self-reducing acid fracturing method sequentially comprises the steps:

(1) determining a reservoir level that needs acid fracturing reconstruction (also referred to as reservoir reconstruction) according to the needs of reservoir reconstruction and geological data of the reservoir, and calculating a fracture pressure $P_a$ of the reconstructed reservoir and a fracture extension pressure $P_F$ of the reconstructed reservoir, wherein the process is as follows:

checking a fracture pressure gradient $\alpha_F$ (MPa/m) of an oil and gas reservoir where an operating well is located, wherein a well depth H(m)×$\alpha_F$ is the fracture pressure $P_\alpha$ of the reconstructed reservoir (Li Yingchuan, Oil Production Engineering, Petroleum Industry Press, February 2009); and checking the parameters of other operated wells during the fracturing construction in the level of the operating well to obtain an instantaneous pump stop pressure $P_S$ on the ground, wherein a hydrostatic column pressure $P_H$ during the fracturing construction of the operating well is calculated, and the sum of $P_S$ and $P_H$ is the fracture extension pressure $P_F$ of the reconstructed reservoir (Jiang Tingxue. Research and Application of On-site Determination Method of Fracture Extension Pressure[J]. Oil Drilling and Production Technology, 1996(05):91-94+109);

(2) injecting an agent A into a stratum by using a high-pressure hydraulic pump truck under a pressure higher than the stratum fracture pressure, so that fractures are generated on the stratum, and stopping the pump after the generated fractures reach geometrical dimensions that meet design requirements;

(3) injecting an agent B into the stratum under a pressure higher than the stratum fracture pressure, such that the agent B extends the fractures and communicates with a natural fracture net;

(4) pumping an acid liquor system agent C with a high etching power into the stratum under a pressure higher than the extension pressure but lower than the fracture pressure to improve the conductivity of the fractures;

(5) injecting a displacing liquid agent D under a pressure lower than the stratum fracture pressure to jack acid liquor in a well casing into the stratum;

(6) shutting down a well for 30-60 min;

(7) opening the well and performing flow-back.

The agent A of the present invention is gel acid or VES acid, and functions to form fractures in the stratum during the acid fracturing process. The gel acid consists of the following components in percentage by weight: 5%-15% of HCl+0.3-0.5% of gel agent+0.5-2% of corrosion inhibitor+0.5-2% of iron ion stabilizer+0.5-2% of drainage aid, the balance of water. The VES acid consists of the following components in percentage by weight: 5-15% of HCl+3-10% of VES+0.5-2% of corrosion inhibitor+0.5-2% of iron ion stabilizer+0.5-2% of drainage aid, and the balance of water.

The agent B of the present invention is a filtration-loss self-reducing gel acid or filtration-loss self-reducing VES acid, and functions to extend fractures, reduce the filtration loss of acid liquor, improve the efficiency of the acid liquor and achieve effective acid distribution in the acid fracturing process. The filtration-loss self-reducing gel acid consists of the following components in percentage by weight: 15%-20% of HCl+5-20% of filtration-loss self-reducing agent+0.3-1% of gel agent+0.1-1% of dispersant+0.5-2% of corrosion inhibitor+0.5-2% of iron ion stabilizer+0.5-2% of drainage aid, and the balance of water. The filtration-loss self-reducing VES acid consists of the following components in percentage by weight: 15%-20% of HCl+5-20% of filtration-loss self-reducing agent+5-10% of VES+0.1-1% of dispersant+0.5-2% of corrosion inhibitor+0.5-2% of iron ion stabilizer+0.5-2% of drainage aid, and the balance of water.

The agent C of the present invention is a closing acid which functions to etch highly conductive flow channels on the fracture walls in near-wellbore areas after the fractures are closed. The closing acid consists of the following components in percentage by weight: 15%-20% of HCl+0-0.2% of gel agent+0-5% of VES+0.5-2% of corrosion inhibitor+0.5-2% of iron ion stabilizer+0.5-2% of drainage aid.

The agent D of the present invention is a displacing liquid which functions to completely displace the agent C into the stratum, so as to reduce the corrosion of the acid liquor to pipe string equipment. The displacing liquid is a 1-3 wt % $NH_4Cl$ aqueous solution or 0.1-1 wt % clay stabilizer aqueous solution.

The gel agent is one or more of polyacrylamide and derivatives thereof, or cellulose and derivatives thereof; and available reagents include: anionic polyacrylamide, cationic polyacrylamide, nonionic polyacrylamide, sulfomethylated polyacrylamide, aminomethylated polyacrylamide, partially hydrolyzed polyacrylamide, methylene polyacrylamide, carboxymethyl cellulose sodium salt, hydroxyethyl cellulose, hydroxypropyl cellulose or carboxymethyl hydroxyethyl cellulose.

The VES is erucamidopropyl hydroxysultaine, erucamide betaine, cocamidopropyl betaine, octadecyl trimethyl ammonium chloride, octadecyl dimethyl betaine, or mixtures thereof.

The filtration-loss self-reducing agent is hydrofluoric acid (HF), fluoboric acid ($HBF_4$), ammonium sulfate (($NH_4)_2SO_4$), ammonium fluoride ($NH_4F$), or mixtures thereof. The filtration-loss self-reducing agent is the technical key of the present invention and is a powerful guarantee for improving the acid fracturing effect, and has the mechanism of action that after the acid liquor system is injected into the stratum, the filtration-loss self-reducing agent chemically reacts with calcium and magnesium ions of acid-soluble minerals to form dispersed solid-phase microgel, which achieves effective filtration in the construction and easily drains out of the ground with flowback liquid after the construction is completed.

The corrosion inhibitor is methylalkynol, methylpentynol, diethylenetriamine, butynylethanol, hexamethylenetetramine, oleic acid, oleic imidazoline, or mixtures thereof.

The iron ion stabilizer is ethylene diaminetetraacetic acid, citric acid, nitrilotriacetic acid, L-glutamic acid, isoascorbic acid, or mixtures thereof.

The drainage aid is polyoxyethylene ether, nonylphenol polyoxyethylene ether, fluorocarbon surfactant, or mixtures thereof.

The dispersant is maleic acid-acrylic acid copolymer, polymaleic acid, 1-hydroxy ethylidene-1,1-diphosphonic acid (HEDP), aminotrimethylene phosphonic acid (ATMP), diethylene triamine pentamethylene phosphonic acid (DTPMP), sodium tripolyphosphate ($Na_5P_3O_{10}$), or mixtures thereof.

The clay stabilizer is 2,3 epoxy propyl-trimethyl ammonium chloride, γ-aminopropyl triethoxysilane, polydimethyl diallyl ammonium chloride, or mixtures thereof.

Compared with the prior art, the present invention has the following beneficial effects:

compared with conventional filtration loss reduction by acid fracturing, it is necessary to inject a whole-liquid-phase filtration-loss self-reducing acid liquor system into the stratum, instead of a solid-phase filtration loss reducing agent into the stratum. The filtration-loss self-reducing acid liquor system is a full liquid phase on the ground and during injection. After entering the reservoir, the filtration-loss self-reducing agent in the acid liquor system reacts with the reservoir minerals, fluids, and acid reactants to form solid-phase microgel, which can achieve effective filtration loss reduction and effective utilization of the acid liquor, and effectively communicate more natural fracture networks, thereby increasing the penetration area of the far-wellbore areas. The present invention can effectively solve the problems of difficult construction injection, poor temperature and salt resistance, difficult degradation and backflow, and easy sand plugging in the existing filtration loss reducing methods, and achieve effective reduction of filtration loss by acid fracturing for carbonate rock reservoirs and improve the reconstruction effect. The method and construction steps involved in the present invention are simple and convenient and low in cost, without additional associated devices, and have a broad application prospect.

DETAILED DESCRIPTION

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

Embodiment 1

Taking an H well engineering reconstruction of an oilfield B as an implementation object by using a filtration-loss self-reducing acid fracturing process. Before the reservoir reconstruction, working fluids required for constructions are prepared, a gel acid agent $A_1$, a filtration-loss self-reducing gel acid agent $B_1$, a closing acid agent $C_1$, and a displacing fluid agent $D_1$.

The agent $A_1$: 15% of HCl+0.3% of sulfomethylated polyacrylamide+0.8% of imidazoline oleate+0.2% of butyne alcohol+0.5% ethylene diaminetetraacetic acid+0.5% of citric acid+1% of fluorocarbon surfactant+0.5% of polyoxyethylene ether, and the balance of water.

Each 100 g of agent $A_1$ is prepared:
adding 42.9 g of 35% HCl, 0.3% of sulfomethylated polyacrylamide, 0.8 g of imidazoline oleate, 0.2 g of butyne alcohol, 0.5 g of ethylene diaminetetraacetic acid, 0.5 g of citric acid, 1 g of fluorocarbon surfactant, 0.5 g of polyoxyethylene ether, and 53.3 g of water.

The agent $B_1$: 20% of HCl+5% of HF+5% of ammonium sulfate+0.3% of sulfomethylated polyacrylamide+0.3% of sodium tripolyphosphate+0.1% of polymaleic acid+1.2% of imidazoline oleate+0.3% of butyne alcohol+1% of ethylene diaminetetraacetic acid+0.5% of citric acid+1% of fluorocarbon surfactant+0.5% of polyoxyethylene ether, and the balance of water.

Each 100 g of agent $B_1$ is prepared:
adding 57.2 g of 35% HCl, 12.5 g of 40% HF, 5 g of ammonium sulfate, 0.3 g of sulfomethylated polyacrylamide, 0.3 g of sodium tripolyphosphate, 0.1 g of polymaleic acid, 1.2 g of imidazoline oleate, 0.3 g of butyne alcohol, 1 g of ethylene diaminetetraacetic acid, 0.5 g of citric acid, 1 g of fluorocarbon surfactant, 0.5 g of polyoxyethylene ether, and 20.1 g of water.

The agent $C_1$: 20% of HCl+1.5% of imidazoline oleate+0.5% of butyne alcohol+1.5% ethylene diaminetetraacetic acid+0.5% of citric acid+0.8% of fluorocarbon surfactant+0.2% of polyoxyethylene ether, and the balance of water.

Each 100 g of agent $C_1$ is prepared:
adding 57.2 g of 35% HCl, 1.5 g of imidazoline oleate, 0.5 g of butyne alcohol, 1.5 g of ethylene diaminetetraacetic acid, 0.5 g of citric acid, 0.8 g of fluorocarbon surfactant, 0.2 g of polyoxyethylene ether, and 37.8 g of water.

The agent $D_1$: 1% of $NH_4Cl$, and the balance of water.
Each 100 g of agent $D_1$ is prepared:
adding 1 g of $NH_4Cl$ and 99 g of water.

In the step 1, Well H is a gas production well, the lithology is carbonate rock, and the well depth of the reconstructed section is 3250-3390 m. The fracture pressure gradient $\alpha_F$ (MPa/m) of the reservoir in this well is 0.02 MPa/m, and the fracture pressure $P_\alpha$, of this well is $(3250+3390)/2\times 0.02=66.4$ MPa. The hydrostatic column pressure $P_H$ of this well is 35.1 MPa, the instantaneous pump stop pressure $P_S$ on the ground is 21 MPa, and the extension pressure $P_F$ is 56.1 MPa.

In step 2, 35000 Kg of gel acid agent $A_1$ is injected at 68-73 MPa and a pump is stopped.

In step 3, 120000 Kg of filtration-loss self-reducing gel acid $B_1$ is injected at 68-80 MPa and the pump is stopped.

In step 4, 50000 Kg of closing acid agent $C_1$ is injected at 58-63 MPa and the pump is stopped.

In step 5, 15000 Kg of displacing fluid agent $D_1$ is injected at 50-60 MPa and the pump is stopped.

In step 6, the well is closed for 45 min.

In step 7, the well is closed for flowback.

During the construction process, the change in the oil pressure of the injected fluid during the filtration-loss self-reducing acid fracturing process in Well H of Oilfield B is recorded. Under the same discharge displacement of 4.9 m$^3$/min, the oil pressure is increased by 3.6 MPa during the injection process of the filtration-loss self-reducing gel acid B, which indicates that the filtration-loss self-reducing system achieves a better filtration loss reducing effect in the process of acid fracturing without adding any filtration loss reducing agent, reduces the filtration loss of acid liquor, improves the effectiveness of the acid liquor, and effectively improves the turning effect of the acid liquor. The filtration-loss self-reducing products generated after the construction can be quickly discharged with residual acid. The discharged filtration-loss self-reducing products are dispersed particles, rather than solid-state agglomerates, which facilitates the removal of the filtration-loss self-reducing system, without any serious damages on the stratum. The field construction verification in Embodiment 1 shows that the method of the present invention can effectively reduce the filtration loss of the acid liquor during the acid fracturing of carbonate reservoirs, increase the effective rate of the acid liquor, and reduce the capital consumption of acid fracturing construction. In addition, the liquid can be injected in an easier manner than acid fracturing in which the filtration loss reducing agent is added directly, and has less damages to equipment.

Embodiment 2

Taking an M well engineering reconstruction of an oilfield B as an implementation object by using a filtration-loss self-reducing acid fracturing process. Before the reservoir reconstruction, working fluids required for constructions are prepared, a VES acid agent $A_2$, a filtration-loss self-reducing VES acid agent $B_2$, a closing acid agent $C_2$, and a displacing fluid agent $D_2$.

The agent $A_2$: 5% of HCl+5% of erucamidopropyl hydroxysultaine+0.3% of imidazoline oleate+0.1% of diethylene triamine+0.1% of methylalkynol+0.2% of citric acid+0.3% of L-glutamic acid+1% of fluorocarbon surfactant, and the balance of water.

Each 100 g of agent $A_2$ is prepared:
adding 14.3 g of 35% HCl, 5 g of erucamidopropyl hydroxysultaine, 0.3 g of imidazoline oleate, 0.1 g of diethylene triamine, 0.1 g of methylalkynol, 0.2 g of citric acid, 0.3 g of L-glutamic acid, 1 g of fluorocarbon surfactant, and 78.7 of water.

The agent $B_2$: 18% of HCl+5% of HF+5% of NH$_4$F+5% of ammonium sulfate+8% of erucamidopropyl hydroxysultaine+0.5% of HEDP+0.1% of polymaleic acid-acrylic acid copolymer+1% of imidazoline oleate+0.3% of diethylenetriamine+0.2% of methylalkynol+0.5% of citric acid+1% of L-glutamic acid+1% of fluorocarbon surfactant, and the balance of water.

Each 100 g of agent $B_2$ is prepared:
adding 51.5 g of 35% HCl, 12.5 g of 40% HF, 5 g of NH$_4$F, 5 g of ammonium sulfate, 8 g of erucamidopropyl hydroxysultaine, 0.5 g of HEDP, 0.1 g of polymaleic acid-acrylic acid copolymer, 1 g of imidazoline oleate, 0.3 g of diethylene triamine, 0.2 g of methylalkynol, 0.5 g of citric acid, 1 g of L-glutamic acid, 1 g of fluorocarbon surfactant, and 13.4 g of water.

The agent $C_2$: 20% of HCl+3% of erucamidopropyl hydroxysultaine+1.2% of imidazoline oleate+0.4% of diethylene triamine+0.4% of methylalkynol+0.5% of citric acid+1.5% of L-glutamic acid+1% of fluorocarbon surfactant, and the balance of water.

Each 100 g of agent $C_2$ is prepared:
adding 57.2 g of 35% HCl, 3 g of erucamidopropyl hydroxysultaine, 1.2 g of imidazoline oleate, 0.4 g of diethylene triamine, 0.4 g of methylalkynol, 0.5 g of citric acid, 1.5 g of L-glutamic acid, 1 g of fluorocarbon surfactant, and 34.8 of water.

The agent $D_2$: 0.5% of polydimethyl diallyl ammonium chloride, and the balance of water.

Each 100 g of agent $D_2$ is prepared:
adding 0.5 g of polydimethyl diallyl ammonium chloride, and 99.5 g of water.

In the step 1, Well H is a gas production well, the lithology is carbonate rock, and the well depth of the reconstructed section is 3218-3355 m. The fracture pressure gradient $\alpha_F$ (MPa/m) of the reservoir in this well is 0.02 MPa/m, and the fracture pressure $P_\alpha$ of this well is (3218+3355)/2× 0.02=65.73 MPa. The hydrostatic column pressure $P_H$ of this well is 34.5 MPa, the instantaneous pump stop pressure $P_S$ on the ground is 21 MPa, and the extension pressure $P_F$ is 55.5 MPa.

In step 2, 30000 Kg of gel acid agent $A_2$ is injected at 66-70 MPa and a pump is stopped.

In step 3, 150000 Kg of filtration-loss self-reducing gel acid $B_2$ is injected at 66-75 MPa and the pump is stopped.

In step 4, 60000 Kg of closing acid agent $C_2$ is injected at 56-60 MPa and the pump is stopped.

In step 5, 12000 Kg of displacing fluid agent $D_2$ is injected at 40-50 MPa and the pump is stopped.

In step 6, the well is closed for 60 min.

In step 7, the well is closed for flowback.

During the construction process, the change in the oil pressure of the injected fluid during the filtration-loss self-reducing acid fracturing process in Well M of Oilfield B is recorded. Under the same discharge displacement of 4.8 m$^3$/min, the oil pressure is increased by 4.5 MPa during the injection process of the filtration-loss self-reducing gel acid B, which indicates that the filtration-loss self-reducing system achieves a better filtration loss reducing effect in the process of acid fracturing without adding any filtration loss reducing agent, reduces the filtration loss of acid liquor, improves the effectiveness of the acid liquor, and effectively improves the turning effect of the acid liquor. The filtration-loss self-reducing products generated after the construction can be quickly discharged with residual acid. The discharged filtration-loss self-reducing products are dispersed particles, rather than solid-state agglomerates, which facilitates the removal of the filtration-loss self-reducing system, without any serious damages on the stratum. The field construction verification in Embodiment 2 shows that the method of the present invention can effectively reduce the filtration loss of the acid liquor during the acid fracturing of carbonate reservoirs, increase the effective rate of the acid liquor, and reduce the capital consumption of acid fracturing construction. In addition, the liquid can be injected in an easier manner than acid fracturing in which the filtration loss reducing agent is added directly, and has less damages to equipment.

Embodiment 3

Taking a Q well engineering reconstruction of an oilfield B as an implementation object by using a filtration-loss self-reducing acid fracturing process. Before the reservoir reconstruction, working fluids required for constructions prepared, i.e., a VES acid agent $A_3$, a filtration-loss self-reducing VES acid agent $B_3$, a closing acid agent $C_3$, and a displacing fluid agent $D_3$.

The agent $A_3$: 10% of HCl+0.5% of carboxymethyl hydroxyethyl cellulose+0.6% of imidazoline oleate+0.2% of oleic acid+0.2% of hexamethylene methyl tetramine+0.3% of nitrilotriacetic acid+0.7% of L-glutamic acid+1% of fluorocarbon surfactant, and the balance of water.

Each 100 g of agent $A_3$ is prepared:
adding 28.6 g of 35% HCl+0.5 g of carboxymethyl hydroxyethyl cellulose+0.6 g of imidazoline oleate+0.2 g of oleic acid+0.2 g of hexamethylene methyl tetramine+0.3 g of nitrilotriacetic acid+0.7 g of L-glutamic acid+1 g of fluorocarbon surfactant, and 67.9 g of water.

The agent $B_3$: 15% of HCl+3% of HF+5% of ammonium sulfate+3% of octadecyl dimethyl betaine+3% of erucamidopropyl hydroxysultaine+0.3% of HEDP+0.1% of polymaleic acid+0.2% of diethylenetriamine penta methylene phosphonic acid+0.8% of imidazoline oleate+0.2% of oleic acid+0.2% of hexamethylenetetramine+0.5% of ethylene diaminetetraacetic acid+0.3% of citric acid+0.4% of L-glutamic acid+1.2% of fluorocarbon surfactant, and the balance of water.

Each 100 g of agent $B_3$ is prepared:
adding 42.9 g of 35% HCl, 7.5 g of HF, 5 g of ammonium sulfate, 3 g of octadecyl dimethyl betaine, 3 g of erucamidopropyl hydroxysultaine, 0.3 g of HEDP, 0.1 g of polymaleic acid, 0.2 g of diethylenetriamine penta methylene phosphonic acid, 0.8 g of imidazoline oleate, 0.2 g of oleic acid, 0.2 g of hexamethylenetetramine, 0.5 g of ethylene diaminetetraacetic acid, 0.3 g of citric acid, 0.4 g of L-glutamic acid, 1.2 g of fluorocarbon surfactant, and 34.4 g of water.

The agent $C_3$: 18% of HCl+0.1% of carboxymethyl hydroxyethyl cellulose+1% of imidazoline oleate+0.2% of oleic acid+0.3% of hexamethylene methyl tetramine+0.5% of ethylene diaminetetraacetic acid+0.5% of citric acid+0.5% of L-glutamic acid+1.5% of fluorocarbon surfactant, and the balance of water.

Each 100 g of agent $C_3$ is prepared:
adding 51.5 g of 35% HCl, 0.1 g of carboxymethyl hydroxyethyl cellulose, 1 g of imidazoline oleate, 0.2 g of oleic acid, 0.3 g of hexamethylene methyl tetramine, 0.5 g of ethylene diaminetetraacetic acid, 0.5 g of citric acid, 0.5 g of L-glutamic acid, 1.5 g of fluorocarbon surfactant, and 43.9 g of water.

The agent $D_3$: 2% of NH$_4$Cl, and the balance of water.

Each 100 g of agent $D_3$ is composed of:
2 g of NH$_4$Cl and 98 g of water.

In the step 1, Well Q is a gas production well, the lithology is carbonate rock, and the well depth of the reconstructed section is 3280-3380 m. The fracture pressure gradient $\alpha_F$ (MPa/m) of the reservoir in this well is 0.02 MPa/m, and the fracture pressure $P_\alpha$ of this well is $(3280+3380)/2 \times 0.02 = 66.6$ MPa. The hydrostatic column pressure $P_H$ of this well is 34.9 MPa, the instantaneous pump stop pressure $P_S$ on the ground is 21 MPa, and the extension pressure $P_F$ is 55.9 MPa.

In step 2, 35000 Kg of gel acid agent $A_3$ is injected at 67-75 MPa and a pump is stopped.

In step 3, 150000 Kg of filtration-loss self-reducing gel acid $B_3$ is injected at 67-80 MPa and the pump is stopped.

In step 4, 60000 Kg of closing acid agent $C_3$ is injected at 50-65 MPa and the pump is stopped.

In step 5, 12000 Kg of displacing fluid agent $D_3$ is injected at 40-50 MPa and the pump is stopped.

In step 6, the well is closed for 45 min.

In step 7, the well is closed for flowback.

During the construction process, the change in the oil pressure of the injected fluid during the filtration-loss self-reducing acid fracturing process in Well Q of Oilfield B is recorded. Under the same discharge displacement of 5.1 m³/min, the oil pressure is increased by 3.3 MPa during the injection process of the filtration-loss self-reducing gel acid B, which indicates that the filtration-loss self-reducing system achieves a better filtration loss reducing effect in the process of acid fracturing without adding any filtration loss reducing agent, reduces the filtration loss of acid liquor, improves the effectiveness of the acid liquor, and effectively improves the turning effect of the acid liquor. The filtration-loss self-reducing products generated after the construction can be quickly discharged with residual acid. The discharged filtration-loss self-reducing products are dispersed particles, rather than solid-state agglomerates, which facilitates the removal of the filtration-loss self-reducing system, without any serious damages on the stratum. The field construction verification in Embodiment 3 shows that the method of the present invention can effectively reduce the filtration loss of the acid liquor during the acid fracturing of carbonate reservoirs, increase the effective rate of the acid liquor, and reduce the capital consumption of acid fracturing construction. In addition, the liquid can be injected in an easier manner than acid fracturing in which the filtration loss reducing agent is added directly, and has less damages to equipment.

The invention claimed is:

1. A carbonate reservoir filtration-loss self-reducing acid fracturing method, sequentially comprising:
(1) determining a reservoir level that needs acid fracturing reconstruction according to needs of reservoir reconstruction and geological data of a reservoir, and calculating a fracture pressure $P_\alpha$ of a reconstructed reservoir and a fracture extension pressure $P_F$ of the reconstructed reservoir;
(2) injecting an agent A into a stratum by using a hydraulic pump under a pressure higher than a stratum fracture pressure, so that fractures are generated on the stratum, and stopping the hydraulic pump after the fractures reach geometrical dimensions that meet design requirements;
(3) injecting an agent B into the stratum under a pressure higher than the stratum fracture pressure, wherein the agent B extends the fractures and communicates with a natural fracture net;
(4) pumping an acid liquor system agent C into the stratum under a pressure higher than an extension pressure but lower than the stratum fracture pressure to improve a conductivity of the fractures;
(5) injecting a displacing liquid agent D under a pressure lower than the stratum fracture pressure to inject an acid liquor in a well casing into the stratum;
(6) shutting down the well for 30-60 min;
(7) opening the well and performing flow-back,
wherein, in the step (2), the agent A is a gel acid or visco-elastic surfactant (VES) acid, wherein the gel acid is selected from the group consisting in percentage by weight of: 5%-15% of HCl, 0.3-0.5% of gel agent, 0.5-2% of corrosion inhibitor, 0.5-2% of iron ion stabilizer, 0.5-2% of drainage aid, and a balance of water; and the VES acid is selected from the group consisting in percentage by weight of: 5-15% of HCl, 3-10% of VES, 0.5-2% of corrosion inhibitor, 0.5-2% of iron ion stabilizer, 0.5-2% of drainage aid, and a balance of water,
wherein the drainage aid is polyoxyethylene ether, nonylphenol polyoxyethylene ether, fluorocarbon surfactant, or mixtures thereof.

2. The carbonate reservoir filtration-loss self-reducing acid fracturing method according to claim 1, wherein, in the step (1), a process of calculating the fracture pressure $P_\alpha$ of the reconstructed reservoir and the fracture extension pressure $P_F$ of the reconstructed reservoir is as follows: checking a fracture pressure gradient $\alpha_F$ of an oil and gas reservoir where an operating well is located, wherein a well depth $H \times \alpha_F$ is the fracture pressure $P_\alpha$ of the reconstructed reservoir $\alpha_F$; and checking parameters of other operated wells during a fracturing construction at a level of the operating well to obtain a pump stop pressure $P_S$ on a ground, wherein a hydrostatic column pressure during the fracturing construction of the operating well is $P_H$, and a sum of $P_S$ and $P_H$ is the fracture extension pressure $P_F$ of the reconstructed reservoir.

3. The carbonate reservoir filtration-loss self-reducing acid fracturing method according to claim 1, wherein, in the step (4), the agent C is a closed acid selected from the group consisting of components in percentage by weight: 15%-20% of HCl, 0-0.2% of gel agent, 0.5% of VES, 0.5-2% of corrosion inhibitor, 0.5-2% of iron ion stabilizer, and 0.5-2% of drainage aid.

4. The carbonate reservoir filtration-loss self-reducing acid fracturing method according to claim 1, wherein the gel agent is one or more of polyacrylamide and derivatives thereof, or cellulose and derivatives thereof; the polyacrylamide and derivatives thereof are
anionic polyacrylamide, cationic polyacrylamide, nonionic polyacrylamide, sulfomethylated polyacrylamide, aminomethylated polyacrylamide, partially hydrolyzed polyacrylamide or methylene polyacrylamide; and the cellulose and derivatives thereof are carboxymethyl cellulose sodium salt, hydroxyethyl cellulose, hydroxypropyl cellulose or carboxymethyl hydroxyethyl cellulose.

5. The carbonate reservoir filtration-loss self-reducing acid fracturing method according to claim 1, wherein the VES is erucamidopropyl hydroxysultaine, erucamide betaine, cocamidopropyl betaine, octadecyl trimethyl ammonium chloride, octadecyl dimethyl betaine, or mixtures thereof.

6. The carbonate reservoir filtration-loss self-reducing acid fracturing method according to claim 1, wherein the corrosion inhibitor is methylalkynol, methylpentynol, diethylenetriamine, butynylethanol, hexamethylenetetramine, oleic acid, oleic imidazoline, or mixtures thereof.

7. The carbonate reservoir filtration-loss self-reducing acid fracturing method according to claim 1, wherein the iron ion stabilizer is ethylenediaminetetraacetic acid, citric acid, nitrilotriacetic acid, L-glutamic acid, isoascorbic acid, or mixtures thereof.

8. The carbonate reservoir filtration-loss self-reducing acid fracturing method according to claim 1, wherein, in the step (3), the agent B is a filtration-loss self-reducing gel acid or filtration-loss self-reducing VES acid, wherein the filtration-loss self-reducing gel acid is selected from the group consisting of in percentage by weight: 15%-20% of HCl, 5-20% of filtration-loss self-reducing agent, 0.3-1% of gel agent, 0.1-1% of dispersant, 0.5-2% of corrosion inhibitor, 0.5-2% of iron ion stabilizer, 0.5-2% of drainage aid, and a balance of water; the filtration-loss self-reducing VES acid is selected from the group consisting of in percentage by weight: 15%-20% of HCl, 5-20% of filtration-loss self-reducing agent, 5-10% of VES+0.1-1% of dispersant, 0.5-2% of corrosion inhibitor, 0.5-2% of iron ion stabilizer, 0.5-2% of drainage aid, and a balance of water.

9. The carbonate reservoir filtration-loss self-reducing acid fracturing method according to claim 8, wherein the filtration-loss self-reducing agent is hydrofluoric acid, fluoboric acid, ammonium sulfate, ammonium fluoride, or mixtures thereof.

10. The carbonate reservoir filtration-loss self-reducing acid fracturing method according to claim 8, wherein the dispersant is maleic acid-acrylic acid copolymer, polymaleic acid, 1-hydroxy ethylidene-1,1-diphosphonic acid, aminotrimethylene phosphonic acid, diethylene triamine pentamethylene phosphonic acid, sodium tripolyphosphate, or mixtures thereof.

11. The carbonate reservoir filtration-loss self-reducing acid fracturing method according to claim 1, wherein, in the step (5), the agent D is a displacing liquid which is a 1-3 wt % $NH_4Cl$ aqueous solution or 0.1-1 wt % clay stabilizer aqueous solution.

12. The carbonate reservoir filtration-loss self-reducing acid fracturing method according to claim 11, wherein the clay stabilizer is 2,3 epoxy propyl-trimethyl ammonium chloride, γ-aminopropyl triethoxysilane, polydimethyl diallyl ammonium chloride, or mixtures thereof.

* * * * *